United States Patent [19]

St. Amand

[11] 4,212,204
[45] Jul. 15, 1980

[54] PIPETTE AND METHOD OF MAKING SAME

[76] Inventor: Elmer F. St. Amand, 12744 Kahlenberg La., N. Hollywood, Calif. 91607

[21] Appl. No.: 33,699

[22] Filed: Apr. 26, 1979

[51] Int. Cl.² .......................... B01L 3/02; B29C 25/00
[52] U.S. Cl. ..................................... 73/425.6; 222/209; 222/420; 264/232; 264/291; 422/100
[58] Field of Search ........................ 73/425.6, 425.4 P; 422/100; 222/209, 420; 264/232, 238, 291

[56] References Cited
U.S. PATENT DOCUMENTS

| | | | |
|---|---|---|---|
| D. 250,599 | 12/1978 | St. Amend | 73/425.6 |
| 3,203,251 | 8/1965 | Robinson | 73/425.6 |
| 3,834,241 | 9/1974 | Garren | 73/425.6 |

*Primary Examiner*—S. Clement Swisher
*Attorney, Agent, or Firm*—John J. Posta, Jr,

[57] ABSTRACT

A pipette having an integral stem and bulb and produced from a blank of plastic, stretchable molded material, said molded blank having a section of smaller cross sectional area than the remainder of the blank and the method consisting of cold stretching the section to reduce its dimensions in order to provide a reduced tip or other portion for the pipette, the stretching of said section resulting in a reduction of approximately 55% in the original dimensions of the section.

20 Claims, 16 Drawing Figures

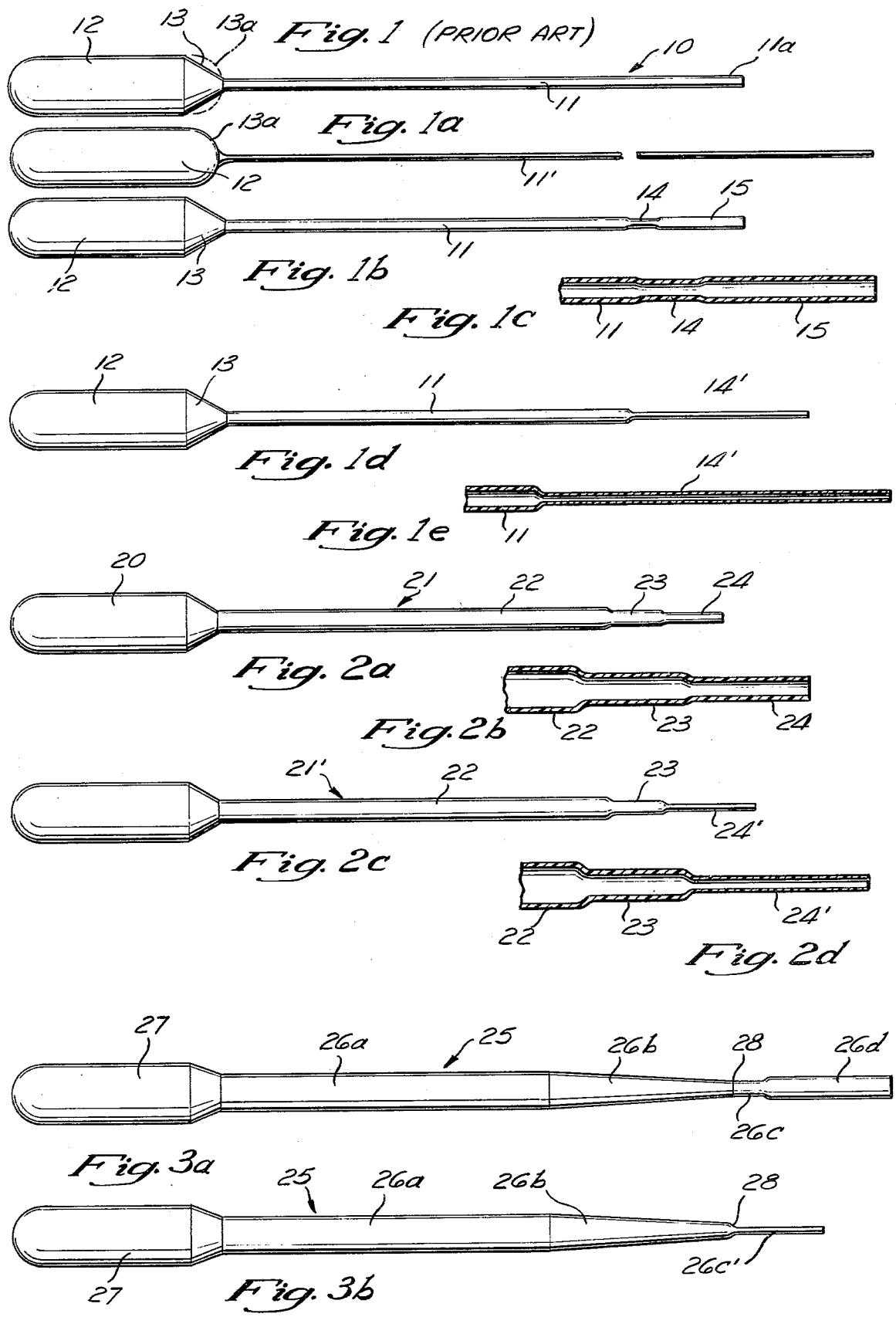

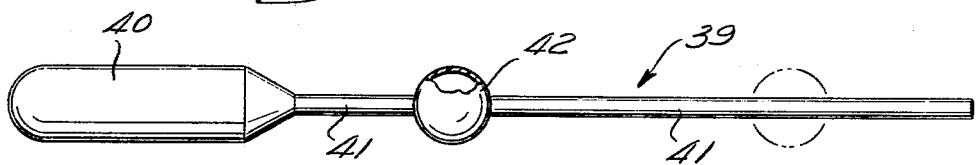
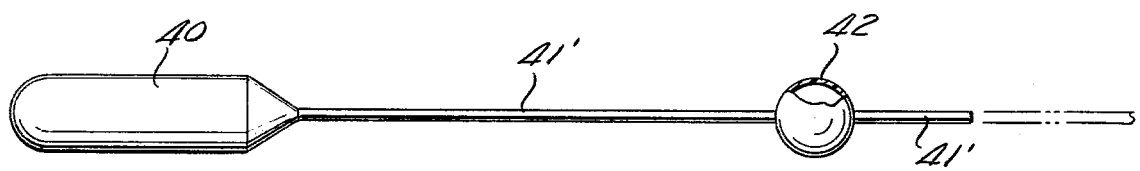
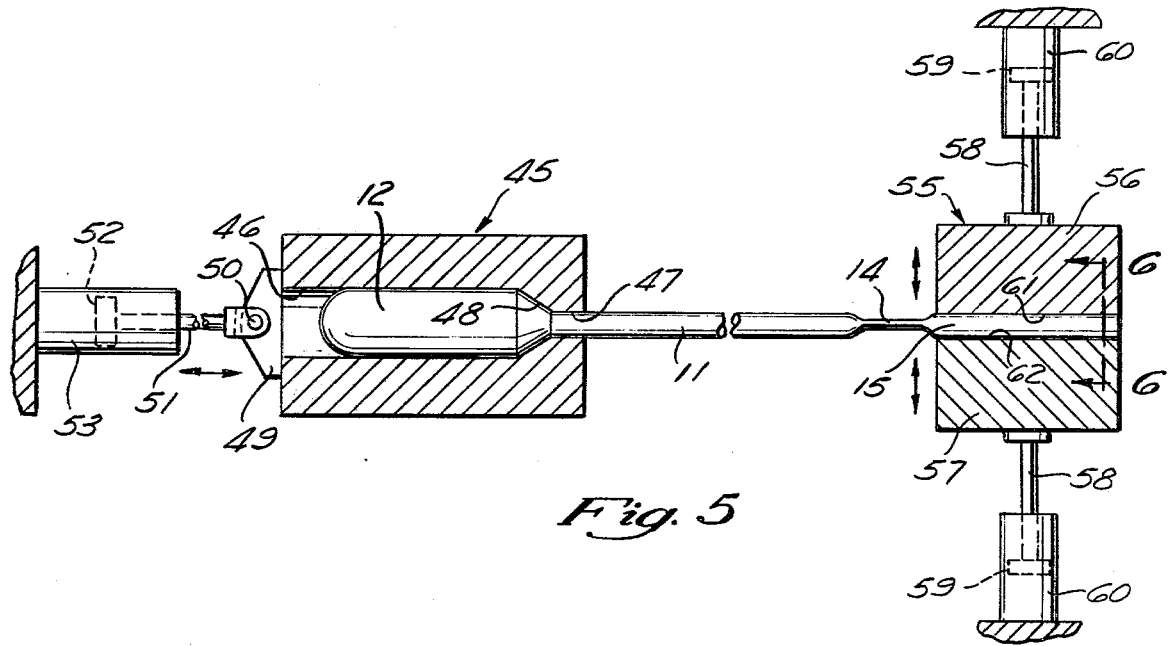
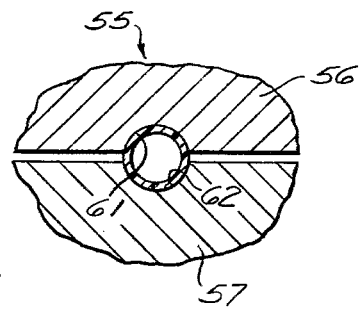

PIPETTE AND METHOD OF MAKING SAME

BACKGROUND OF THE INVENTION

Pipettes are used to deliver drops of liquid, such as blood serum, into another container or onto a prepared surface. Until recently, pipettes were constructed of a glass tube having a small diameter connected with a flexible rubber bulb to produce a vacuum by squeezing to draw the liquid into the glass tube. Since the rubber bulb is used successively with different glass tubes, there is the danger of cross contamination from one test to another. Disposable pipettes have been molded from a plastic material, such as polyethylene, and consist of a thin plastic stem integral with a plastic bulb at one end. The pipette is a single piece of plastic having an opening at the end of the stem and the stem is inert to various liquids dispensed by the pipette. The bulb is constructed of thin enough material so that it can be squeezed between the thumb and forefinger and will promptly return to original shape.

One of the difficulties with the plastic pipette is that the plastic is not completely clear and it is difficult to observe the liquid within the stem. Also, it is not possible in the molding procedures to produce a pipette tip having a very small diameter opening required to dispense very small drops of liquid. Also, the stem is not flexible enough to be bent to reach locations in the containers where the liquid to be withdrawn might be located.

One molding process for producing plastic pipettes is the injection blow process in which a blank tube is placed into a mold and then blown up to assume the shape of the mold cavity after the mold is closed. In this process, the wall thickness of the pipette changes with the diameter of the particular pipette section. Another molding process utilizes a mold having a cavity of the desired shape of the pipette and a portion of a blank tube of uniform diameter and thickness is forced into the cavity when the mold is closed. In this method, there is flash around each of the pipettes at the locations where the mold pieces close together and the wall thickness is substantially uniform throughout the stem and the bulb.

In U.S. Pat. No. 3,608,146 to R. E. Dunipace, granted Sept. 28, 1971, it has been proposed to produce a plastic pipette from a blank of extruded thermoplastic tubing of uniform dimension by heating the center of the blank tube and stretching the tube. The heating is at the medial portion of the blank and the medial portion is then elongated axially to form a localized area of reduced section. The area is then cooled and severed medially of its length to form a tapered delivery or discharge end on each of the two similarly shaped pipettes. The material utilized in the stretching process is polystyrene or the like which must be heated in order to stretch. Otherwise, it will break like glass. In U.S. Pat. No. 3,276,847 to Duff, granted Oct. 4, 1966, it is proposed to equip a plastic pipette dropper with an end piece consisting of a steel pipe of small diameter to obtain an outside diameter of 0.042 inch and an inside diameter of 0.027 inch. In the patent to Robinson U.S. Pat. No. 3,203,251 there is disclosed a pipette tube having reduced portions on each end, one end being the receiving end for the enlarged pipette central portion and the other end being the discharge end. It is stated that the diameter of these passages would be in the order of 0.015 and 0.003 inch respectively, but the material from which the pipette is produced and the method for producing the end are not disclosed.

Other U.S. Pat. Nos. resulting from the search are as follows: Staples 1,728,016; Wright, 2,199,602; Palmer, 2,306,995; McConnell, 2,772,704; Hind, 2,861,572; Loxley, 3,652,248; Szecsi, 2,153,105.

SUMMARY OF THE INVENTION

The invention relates to a pipette having an integral stem and bulb, and produced from a molded plastic blank of stretchable material, such as polyethylene or polypropylene, by a method consisting of cold stretching one or more sections of the pipette. The opening in the stretched pipette tip is smaller than can be obtained by molding alone since the smallest molded tip can be stretched to even a smaller diameter. Also, the cold stretching of the tip causes the material of the stretched end to become clear to provide for improved handling of the liquid since the liquid can be observed as it is being picked up. Also, by reducing the outside diameter of the stem to about 0.045 inch, the stem becomes flexible so that it can be introduced into small spaces containing liquid which cannot be reached by the rigid end of prior pipettes.

The method of producing the pipette from polyethylene consists of holding the pipette by a clamp at the end of the stem and clamping onto the bulb with another clamp and then producing a pulling force on the bulb to cold stretch the plastic material. The stem will start to stretch at the smallest diameter or if the tube is of uniform diameter, then it will start to stretch at the weakest diameter. When the smallest cross section is at the end of the stem, the stretching will commence at one location and will continue down to a predetermined level of thickness progressively along the stem until the stretching is stopped. During stretching, there is no substantial change in stem dimensions over the remainder of the stem and bulb which is larger in cross section than the stem section being stretched. The outside and inside diameters of the stretched section will be reduced, as well as the wall thickness. The plastic material from which the blank is produced becomes clear over the stretched portion and fluid within a stretched tip of the stem can be easily observed. Since the stretching starts at one location and advances along the stem, only sufficient stretching is required to produce the desired length of reduced section. In general, it has been found that the reduction in outside diameter and inside diameter and in the wall thickness is about 55%, independently of the initial dimensions of the stem. A reduced diameter section, produced in the blank, can be placed in the stem at any desired location to determine the location where the stretching to reduced size will take place. By utilizing low density polyethylene, it is not necessary to heat the plastic and the plastic can be pulled in a cold state at ambient temperatures ranging from 30° F. to 125° F.

BRIEF DESCRIPTION OF THE DRAWINGS

FIG. 1 is a side elevational view of a standard plastic pipette having a bulb integral with a stem of uniform dimensions;

FIG. 1a is a view similar to that of FIG. 1 after the stem has been cold stretched along its length to produce a smaller stem of smaller uniform dimensions;

FIG. 1b is a side elevational view of a modification of FIG. 1 in which a section of the molded stem has been reduced in diameter prior to stretching;

FIG. 1c is an enlarged cross section of the reduced diameter section of FIG. 1b;

FIG. 1d is a side elevational view of the pipette of FIG. 1b after the reduced section has been cold stretched;

FIG. 1e is an enlarged cross section of the pipette of FIG. 1d;

FIG. 2a is a side elevational view of a standard plastic pipette having a stepped end on the stem;

FIG. 2b is an enlarged cross section of the stepped end of FIG. 2a;

FIG. 2c is a side elevational view of the pipette of FIG. 2a after the smallest diameter of the stepped end has been stretched;

FIG. 2d is an enlarged cross section of the stepped end of the stem of FIG. 2c;

FIG. 3a is a partial side elevational view of the stem of a standard tapered plastic pipette modified to have a straight end portion;

FIG. 3b is a side elevational view of the tapered pipette of FIG. 3a after the straight end portion of the tube has been cold stretched and cut off;

FIG. 4a is a side elevational view of a pipette blank having a bulb section located in a uniform stem;

FIG. 4b is a side elevation of the pipette of FIG. 4a after cold stretching to reduce the sections of the stem on opposite sides of the bulb;

FIG. 5 is a schematic illustration of a stretching mechanism attached to the pipette of FIG. 1b;

FIG. 6 is a vertical section along line 6—6 of FIG. 5.

DESCRIPTION OF THE PREFERRED EMBODIMENT

Referring to FIG. 1a the polyethylene pipette 10 has a stem 11 and a bulb 12 which can have a tapered connection 13 therebetween or a dome connection 13a as illustrated by the dashed line of FIG. 1 and in FIG. 1a. Bulb 12 is normally ½ inch in diameter and 1½ inches long. The stem 11 is of uniform inside and outside diameter throughout its length. For instance, the outside diameter can be 0.100 inch and the inside diameter is 0.060 inch and the wall thickness is 0.020 inch. When both the bulb 12 and the end 11a of the stem 11 are gripped and a pulling force placed on the bulb, the stem 11 will commence to stretch at the weakest location and will stretch at this location down to an outside diameter of approximately 0.045 inch and an inside diameter of approximately 0.027 inch and this stretching will progress along the tube in the same manner until the desired length of the reduced stem is obtained. In FIG. 1a, the stretched stem 11' has been cut to the desired length and has uniform dimensions along its length, namely an outside diameter of 0.045 inch, an inside diameter of 0.027 inch and a wall thickness of 0.009 inch. All the dimensions of the stretched stem are uniformly reduced by approximately 55% as a result of the cold stretching of the tube. Since the bulb 12 has the same thickness as the unstretched tube (0.020 inch) and has a greater diameter than the stem, no stretching of the bulb results.

A modified form of polyethylene pipette illustrated in FIG. 1b has a reduced section 14 in the stem produced by the mold so that the reduced section has the same wall thickness as the remainder of stem 11 as illustrated in FIG. 1c. The reduced section 14 provides an end section 15 on the stem 11 which can be gripped by the clamp prior to cold stretching. The outside diameter of the section 14 is 0.090 inch which is only slightly less than the outside diameter (0.100 inch) of the remainder of the stem, but the wall thickness is the same, namely 0.020 inch. When the stretching force is placed on the stem, the stretching will take place at section 14 and will reduce the section down to the tip section 14' illustrated in FIG. 1d while the remaining section of the stem 11 will remain at its original dimensions. An enlarged view of the section 14' is illustrated in FIG. 1e and the dimensions of section 14' are slightly less than stem 11' of FIG. 1a, namely an outside diameter of 0.040 inch, an inside diameter of 0.023 inch and a wall thickness of 0.009 inch. The end of section 14' is cut off after stretching to the desired length. The dimensions of the pipette of FIG. 1d could have a tip 14' one inch long and a total overall stem length of 4½ inches and the dimensions of the stem 11 remain unchanged during stretching.

FIG. 2a illustrates a standard stepped polyethylene pipette having a bulb 20 and a stepped stem 21 having sections 22, 23 and 24 of different diameters. The wall thickness of the tube 21 can be 0.020 inch throughout the entire length as illustrated in the enlarged cross section of FIG. 2b. Since the section 24 has the smallest cross sectional diameter, a pull placed between the bulb 20 and the end section 24 will cause the end section 24 to commence stretching at its weakest point and this stretching will continue along the section 24. The section 22 can have an outside diameter of 0.190 inch, the section 23 an outside diameter of 0.125 inch, and the end 24 an outside diameter of 0.100 inch. After the stretching of the section 24, the end is cut off to produce the end section 24' which has an outside diameter of 0.045 inch, an inside diameter of 0.027 inch, and a reduced wall thickness of 0.009 inch. The enlarged sectional view of FIG. 2d illustrates that the thicknesses of sections 22 and 23 have remained unchanged while the thickness of section 24' is reduced, and the reduction in the section 24' in all dimensions has been approximately 55%. It is understood that if the cold stretching of stem 11 of FIG. 1 or of stem section 24 of FIG. 2a were continued after all of the material has been stretched to the new dimensions, the stretched section will then break.

Referring again to FIG. 2a, the end section 24 could be removed and then the cold stretching would take place in the smallest diameter section 23. The original dimension of section 23 is 0.125 inch outside diameter, 0.085 inside diameter, and a thickness of 0.020 inch. After stretching of the section 23, the outside diameter would be 0.055 inch, the inside diameter would be 0.037 inch and the wall thickness would be 0.009 inch. Here again, all of the dimensions after stretching would be reduced by about 55%. Finally, if both sections 23 and 24 in FIG. 2a were removed, the cold stretching would then take place in the remaining stem section 22. The original dimensions of section 22 can be 0.190 inch outside diameter, 0.150 inch inside diameter and a wall thickness of 0.020 inch. After stretching of the section 22, the final dimensions would be outside diameter 0.080 inch, inside diameter 0.062 inch and a thickness of 0.009 inch so that the change in dimensions would range between 55% and 58%.

FIG. 3a illustrates a tapered polyethylene pipette 25 having a stem 26a and a bulb 27. Section 26a of the stem has a uniform outside diameter of approximately 0.312 inch, and section 26b of the stem is tapered down to about 0.125 inch outside diameter at location 28. From this location, a section 26c of uniform diameter of 0.125 inch extends for a predetermined length, such as ¼ inch, and connects with enlarged uniform diameter end section 26d of about 0.190 inch outside diameter. The thickness of all the sections will be the same at 0.020 inch. For cold stretching, clamps grip the bulb 27 and end section 26d, and stretching takes place in section 26c since it has the smallest diameter. The stretching will continue until the section 26c is reduced uniformly between location 28 and end section 26d and thereafter the end 26d is cut off to provide the reduced end 26c' illustrated in FIG. 3b. The final dimensions of section 26c' are 0.055 inch outside diameter, 0.037 inch inside diameter and a wall thickness of 0.009 inch. In the event that the tapered end 26b were removed from the pipette of FIG. 3a and a cold stretching force placed upon the section 26a having 0.272 inch inside diameter, the tube would stretch along its length and the final dimensions would be 0.140 inch outside diameter, 0.122 inch inside diameter and the wall thickness of approximately 0.009 inch which again represents a reduction in the dimensions of about 55%.

A polyethylene pipette 39 is illustrated in FIG. 4a which has a bulb 40 and a stem 41 containing an enlarged chamber 42 which is to be filled with a specific amount of fluid. The stem section can have an initial outside diameter of 0.125 inch, an inside diameter of 0.085 inch and a wall thickness of 0.020 inch. When the end of the stem 41 is gripped and a cold stretch force applied between bulb 40 and the end of the stem, the sections of the stem 41 on opposite sides of the chamber will stretch to have a 0.055 inch outside diameter, 0.037 inch inside diameter and 0.009 inch thickness, resulting from a reduction in dimensions of about 55% as illustrated by Section 41' in FIG. 4b. No change in the dimensions of the bulb 40 or chamber 42 results since the cross-sectional areas of these portions are greater than that of the stem 41 and the original thickness is the same as stem 41, namely 0.020 inch. Obviously, the end of the stem beyond the chamber 42 can be cut off to any desired length. In use, the bulb 40 can be squeezed and liquid drawn in the end of the stem until the bulb 42 is filled. Since the stem sections 41' are clear because of the cold stretching, the operator can determine when liquid is entering the chamber and when it has started to leave the other side of the chamber. Therefore, a very accurate volume measurement can be obtained.

In order to determine the ratio of dimension change for various other wall thicknesses, it was found that a polyethylene tube of 0.030 inch initial thickness would reduce to 0.013 inch, an initial wall thickness of 0.035 inch would reduce to 0.015 inch, and an initial thickness of 0.012 inch would reduce to 0.005 inch. In all of these cases, the change in dimension of wall thickness is again about 55% regardless of other tube dimensions. It is understood, however, that the thickness after stretching can vary slightly along the stretched section, which results from variations in the original blank. During the actual tests, it was found that while the percentage change in all stem dimensions resulting from cold stretching was practically 55%, there were variations from about 53% to 58%. With a 55% reduction, the final dimensions are 45% of the initial dimensions.

In general, it is preferable to have a blank pipette, such as illustrated in FIGS. 1b and 3a, in which the gripped end opposite the bulb is slightly larger than the section to be stretched so that stretching will not occur in the region where the holding clamp grips the end, and all stretching will take place in the smaller section adjoining the location where the stem is gripped. When a stem section of uniform thickness has a weak location, the stretching of the section will commence at this weakest point first and will progress in both directions from the point until the complete section is reduced to the same final dimensions along its entire length. When the final outside tip diameter of the stretched end is approximately 0.045 inch or less and 0.009 inch wall thickness or less, the stem end is flexible and can be bent without breaking or kinking in order to enter restricted spaces. Also, by reducing the end of the pipette tube which enters the liquid, smaller drops can be formed which is important in the study of specimens under microscopes. While the above description refers to polyethylene plastics, it is understood other thermoplastics of the polyolefin group, such as polypropylene, can be utilized. The stretching of these materials can be accomplished at room temperature and it is not necessary to heat the plastic before the cold stretching is commenced. Generally, the stretching can be accomplished at ambient temperature defined to be within the range of approximately 30° F. to 125° F. At temperatures lower than approximately 30° F., the material is more difficult to stretch without breaking because it becomes too brittle and at temperatures higher than 125° F., the material is more difficult to stretch because it becomes too pliable to stretch uniformly.

Although it is practical to stretch polyethylene blanks to approach zero dimensions, a practical lower limit to blank dimensions before stretching to produce a pipette is 0.050 inch outside diameter with a wall thickness of 0.010 inch. Blanks with dimensions less than such dimensions could still be stretched with the same reduction, namely approximately 55%. However, tubing blanks with lesser dimensions when stretched would be too flexible, too flimsy and not practical for use. After actual stretching, this tube had an outside diameter of 0.023 inch, an inside diameter of 0.013 inch and a wall thickness of 0.0045 inch. Also, tube blanks with dimensions less than 0.050 inch outside diameter and 0.010 inch wall thickness are difficult to produce in a molding process. If a blank with lower dimensions is produced, it would have good clarity without stretching. In other words, walls of blanks with initial wall thickness of 0.010 inch are relatively clear and clarity is not substantially improved by stretching. A practical upper limit to tube blank dimensions which are stretched to produce pipettes is 0.312 inch outside diameter and 0.035 inch wall thickness. These dimensions when stretched will produce a tip having an outside diameter of 0.140 inch, a 0.108 inch inside diameter with a wall thickness of 0.015 inch. A wall thickness larger than 0.035 inch is not practical for a pipette since thicknesses greater than 0.035 are difficult to stretch and control. The stretching of a tube blank having an outside diameter of 0.312 inch and a wall thickness of 0.010 inch resulted in a satisfactory pipette having an inside diameter of 0.131 inch and a wall thickness of 0.0045 inch.

In general, the final dimensions of stretched polyethylene pipette tips should fall within the range of 0.013 inch to 0.131 inch inside diameter and 0.0045 inch to 0.015 inch wall thickness. When the pipette blank is molded by a process which gives it substantially uniform thickness, blank wall thicknesses in the range of about 0.010 inch to 0.035 inch will produce satisfactory bulbs for use with the tip after stretching. Of course, the wall thickness of the blank cannot be so great in the area to be stretched that there is no hole in the area before stretching.

From the above discussion, it has been determined by actual tests that practical pipette tips can be produced by cold stretching of blanks having a range of outside diameter from 0.050 inch to 0.312 inch and a range of wall thickness from 0.010 inch to 0.035 inch with the provision that the wall thickness for the smaller diameter blank tips must be small enough to provide a hole in the blank. Obviously, a wall thickness of 0.035 inch could not be used for a blank with 0.050 inch outside diameter and still produce an inside diameter within the range of 0.013 to 0.131 inch.

While the previous discussion has referred to the stretching of a blank section of uniform dimensions along its length, it is understood that a section of varying dimensions along its length can be stretched by gripping at the smallest cross-sectional area of the section where stretching is to begin and stretching the material progressively away from this smallest cross sectional area toward the other gripping point. Referring to the tapered section 26b of FIG. 3a, this tapered section could be gripped at a first point intermediate its ends so that all cross-sectional areas of this section toward the bulb, or other gripping point, would be larger than the cross-sectional area at the first gripping point. Upon applying a cold stretching force between these two gripping points, the material would stretch from the first gripping point toward the other gripping point and provide a stretched portion of section 26b formed of the material of a portion of the section which has been stretched out to form a tip. Thereafter, the stretched portion would be cut off either at the first gripping point or along the stretched portion to produce a tip end for the pipette. It is understood that the dimensions of this stretched portion can still be within the dimension ranges set forth above for satisfactory pipette structure.

A device for stretching the pipette is illustrated in FIGS. 5 and 6 and the blank shown in FIG. 1b is positioned in the device ready to be stretched. A cylindrical fitting 45 has an opening 46 slightly larger than bulb 12 and reduces down to an opening 47 slightly larger than stem 11. The reduced section 48 corresponds in shape to the reducing section 13 or 13a on the pipette bulb. The fitting has a lug 49 attached thereto with an opening for bolt 50 which serves to attach an end of rod 51 to the lug 49. The other end of rod 51 can be attached to any suitable power unit, such as to the piston 52 contained in cylinder 53. The end 15 of the stem can be clamped in fitting 55 between the two parts 56 and 57. Each part is connected to a power unit by a rod 58 connected to a piston 59 in a cylinder 60, but any other type of power unit can be used. The inside curved surfaces 61 and 62 of the fitting parts can be forced tight around the stem 15 since they do not meet at the opposed edges of the halves. When stem 15 is securely clamped, a force applied to rod 51 will cause section 48 to engage the section 13 of the bulb and cause section 14 to stretch.

One advantage of the process is that after the stretching starts at a given weakest point, the stretching goes on to completion at this point and then continues down the tube so that the stretching can be stopped at any time that the desired length of reduced stem is obtained, even though stretching has not started in other parts of the stem section being stretched. Since the stretching from any original to final dimensions has resulted in a reduction of a predictable percentage, namely about 55%, it is possible to select a blank section which will produce the desired dimensions after stretching. All of the examples of dimension reductions set forth herein are the result of actual stretching of tube blanks of each example. While all of the above description refers to stretching of pipettes produced from polyethylene plastic, tests have been conducted with some similar blanks formed of polypropylene plastic and these blanks have been found to cold stretch in a similar manner, but the change in dimensions is not as great as with polyethylene blanks. The pipettes of polypropylene material were found to be satisfactory. Since other plastic materials in the polyolefin group have similar properties, they should stretch in a similar manner with varying percentage reductions in dimensions. Both novel pipette structures and a novel method of producing same are provided and it is understood that all ranges and dimensions are considered approximate only and minor variations therein are contemplated.

What is claimed is:

1. A pipette for the dispensing of liquids comprising:
    a hollow bulb and hollow stem connected thereto and constructed of a stretchable plastic material;
    said stem comprising a stretched section having an inside diameter in the approximate range of 0.013 to 0.131 inch and a wall thickness in the approximate range of 0.0045 to 0.015 inch, the thickness also being small enough to provide an inside passage in said stretched section.

2. A pipette as defined in claim 1 wherein said pipette is constructed of polyethylene.

3. A pipette as defined in claim 1; said stretched section having an outside diameter in the approximate range of 0.023 to 0.140 inch.

4. A pipette as defined in claim 1 wherein said stretched section has an outside diameter of 0.045 inch or less and a wall thickness of 0.009 inch or less to be flexible and bend without breaking or kinking.

5. A pipette as defined in claim 1 wherein:
    said bulb and stem are molded of said plastic material;
    said stem section being the smallest cross sectional area of said pipette both before and after stretching.

6. A pipette as defined in claim 1 wherein said stretched section is of substantially uniform dimensions along its length and is the smallest section of said stem.

7. A method for producing a pipette for dispensing liquids comprising the steps of:
    molding a hollow pipette blank from a stretchable plastic material;
    providing in said blank a section of initial uniform dimensions along its length and of smaller cross sectional area than the remainder of the blank; and
    stretching said section of said blank until said section progressively reduces to final smaller uniform dimensions along its stretched length.

8. A method for producing a pipette as defined in claim 7 wherein said plastic material is polyethylene.

9. A method for producing a pipette as defined in claim 7 wherein:
    said section is located at one end of said blank;
    said section after stretching being cut off to produce a tip of selected length.

10. A method for producing a pipette as defined in claim 8 wherein said section is stretched until said smaller uniform dimensions are approximately 45% of said initial uniform dimensions, resulting in approximately a 55% reduction in all said initial dimensions.

11. A method for producing a pipette as defined in claim 8 wherein said section is stretched until said initial uniform dimensions are reduced to said final dimensions by approximately 53% to 58%.

12. A method for producing a pipette as defined in claim 8 wherein said initial dimensions of said section are reduced to produce said final dimensions in the range of 0.0045 to 0.015 inch wall thickness and 0.013 to 0.131 inch inside diameter.

13. A method for producing a pipette as defined in claim 8 wherein said blank is molded to have a uniform initial thickness in the range of 0.010 to 0.035 inch to provide proper squeezing action of said remainder of said pipette.

14. A method for producing a pipette as defined in claim 7 wherein said hollow pipette blank is molded to consist of a bulb connected with a stem comprising said section.

15. A method for producing a pipette as defined in claim 7 wherein said hollow pipette blank is molded to consist of a bulb connected with a stem containing said section as a portion thereof, said section after stretching being cut to form a tip on said stem.

16. A method for producing a pipette as defined in claim 7 wherein said stretching is commenced at one point in said section and continues to said final dimensions at said point, said stretching progressing from said point along said section until a preselected length of stretched section has been produced.

17. A method for producing a pipette as defined in claim 8 wherein said plastic material is at ambient temperatures within the approximate range of 30° F. to 125° F. during stretching.

18. A method of producing a pipette for dispensing liquids comprising the steps of:
   molding a hollow pipette blank from a stretchable plastic material;
   gripping said blank at two points, the location at one of said gripping points having a smaller cross-sectional area than the remainder to the blank extending to the other gripping point;
   stretching said blank progressively from said one point toward said other point to produce from corresponding material dimensions of the stretched portion proportional to its original dimensions; and
   severing said stretched portion to produce a tip end for said pipette.

19. A method for producing a pipette as defined in claim 18 wherein said plastic material is polyethylene.

20. A method for producing a pipette as defined in claim 19 wherein said proportional reduction is approximately 55%.

* * * * *